(12) United States Patent
Cao et al.

(10) Patent No.: US 12,323,202 B2
(45) Date of Patent: Jun. 3, 2025

(54) EXPLICIT BEAMFORMING IN A HIGH EFFICIENCY WIRELESS LOCAL AREA NETWORK

(71) Applicant: Marvell Asia Pte Ltd, Singapore (SG)

(72) Inventors: Rui Cao, Fremont, CA (US); Hongyuan Zhang, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/520,523

(22) Filed: Nov. 27, 2023

(65) Prior Publication Data

US 2024/0097748 A1 Mar. 21, 2024

Related U.S. Application Data

(60) Continuation of application No. 17/718,077, filed on Apr. 11, 2022, now Pat. No. 11,831,367, which is a
(Continued)

(51) Int. Cl.
*H04B 7/0417* (2017.01)
*H04B 7/0456* (2017.01)
(Continued)

(52) U.S. Cl.
CPC ......... *H04B 7/0421* (2013.01); *H04B 7/0456* (2013.01); *H04B 7/0626* (2013.01);
(Continued)

(58) Field of Classification Search
CPC .. H04B 7/0421; H04B 7/0482; H04B 7/0456; H04B 7/0626; H04B 7/066;
(Continued)

(56) References Cited

U.S. PATENT DOCUMENTS 6,862,440 B2   3/2005   Sampath
7,206,354 B2   4/2007   Wallace et al.
(Continued)

FOREIGN PATENT DOCUMENTS

CN       1981456 B    1/2012
CN     103210592 A    7/2013
(Continued)

OTHER PUBLICATIONS

Decision of Dismissal of Amendment in Japanese Patent Application No. 2017-563216, dated Aug. 27, 2021, with English translation (7 pages).
(Continued)

*Primary Examiner* — Leila Malek

(57) ABSTRACT

A first communication device receives a sounding packet from a second communication device and develops beamforming information based on the sounding packet. The first communication device transmits beamforming feedback to the second communication device, the beamforming feedback including beamforming information for use by the second communication device to beamsteer a data packet to the first communication device, the data packet having a data portion that includes a second number of OFDM tones greater than a first number of OFDM tones in the sounding packet. After transmitting the beamforming feedback, the first communication device receives the data packet from the second communication device, the data packet including one or more data OFDM symbols, each of the one or more data OFDM symbols having the second number of OFDM tones.

24 Claims, 7 Drawing Sheets

Related U.S. Application Data continuation of application No. 16/700,562, filed on Dec. 2, 2019, now Pat. No. 11,303,330, which is a continuation of application No. 16/173,955, filed on Oct. 29, 2018, now Pat. No. 10,498,409, which is a division of application No. 15/176,934, filed on Jun. 8, 2016, now Pat. No. 10,116,359.

(60) Provisional application No. 62/244,278, filed on Oct. 21, 2015, provisional application No. 62/172,500, filed on Jun. 8, 2015.

(51) Int. Cl.
*H04B 7/06* (2006.01)
*H04L 5/00* (2006.01)
*H04W 16/28* (2009.01)

(52) U.S. Cl.
CPC ........... *H04B 7/066* (2013.01); *H04L 5/0007* (2013.01); *H04W 16/28* (2013.01)

(58) Field of Classification Search
CPC ............... H04L 5/0007; H04L 27/2602; H04L 27/2627; H04L 5/003; H04L 5/0048; H04W 16/28; H04W 28/065
USPC ........................................................ 375/267
See application file for complete search history.

(56) References Cited

U.S. PATENT DOCUMENTS

| | | | |
|---|---|---|---|
| 7,486,740 | B2 | 2/2009 | Inanoglu |
| 7,599,332 | B2 | 10/2009 | Zelst et al. |
| 7,729,439 | B2 | 6/2010 | Zhang et al. |
| 7,742,390 | B2 | 6/2010 | Mujtaba |
| 8,155,138 | B2 | 4/2012 | Van |
| 8,270,909 | B2 | 9/2012 | Zhang et al. |
| 8,289,869 | B2 | 10/2012 | Sawai |
| 8,526,351 | B2 | 9/2013 | Fischer et al. |
| 8,619,907 | B2 | 12/2013 | Mujtaba et al. |
| 8,724,720 | B2 | 5/2014 | Srinivasa et al. |
| 9,007,263 | B2 | 4/2015 | Su et al. |
| 9,166,660 | B2 | 10/2015 | Chu et al. |
| 9,197,298 | B2 | 11/2015 | Kim et al. |
| 9,252,991 | B2 | 2/2016 | Zhang |
| 9,397,873 | B2 | 7/2016 | Zhang et al. |
| 10,116,359 | B2 | 10/2018 | Cao et al. |
| 10,158,516 | B2 | 12/2018 | Choi et al. |
| 11,303,330 | B2 | 4/2022 | Cao et al. |
| 11,831,367 | B2 | 11/2023 | Cao et al. |
| 2006/0063492 | A1 | 3/2006 | Iacono et al. |
| 2007/0160011 | A1 | 7/2007 | Kim et al. |
| 2007/0189406 | A1* | 8/2007 | Kim ...................... H04L 27/265 375/260 |
| 2007/0253501 | A1* | 11/2007 | Yamaura ........... H04L 25/03159 375/262 |
| 2009/0196163 | A1 | 8/2009 | Du |
| 2011/0064010 | A1* | 3/2011 | Zhong ................. H04B 7/0814 370/310 |
| 2011/0261708 | A1 | 10/2011 | Grandhi |
| 2012/0039196 | A1 | 2/2012 | Zhang |
| 2012/0062421 | A1 | 3/2012 | Su et al. |
| 2012/0300874 | A1 | 11/2012 | Zhang |
| 2013/0039213 | A1 | 2/2013 | Averbuch et al. |
| 2013/0308713 | A1 | 11/2013 | Zhang |
| 2015/0117433 | A1 | 4/2015 | Zhang et al. |
| 2015/0146807 | A1 | 5/2015 | Zhang |
| 2015/0326408 | A1* | 11/2015 | Vermani ............... H04L 5/0048 370/328 |
| 2015/0365266 | A1 | 12/2015 | Zhang et al. |
| 2016/0105836 | A1 | 4/2016 | Seok |
| 2016/0359532 | A1 | 12/2016 | Cao et al. |
| 2017/0093605 | A1 | 3/2017 | Huang et al. |
| 2017/0111201 | A1 | 4/2017 | Sandell et al. |
| 2019/0068254 | A1 | 2/2019 | Cao et al. |

FOREIGN PATENT DOCUMENTS

| | | |
|---|---|---|
| CN | 103210592 B | 4/2016 |
| JP | 2007174353 A | 7/2007 |
| JP | 2007221796 A | 8/2007 |
| JP | 2007318729 A | 12/2007 |
| JP | 2013538530 A | 10/2013 |
| WO | 2005114868 A1 | 12/2005 |
| WO | 2015061729 A1 | 4/2015 |

OTHER PUBLICATIONS

Decision of Refusal in Japanese Patent Application No. 2017-563216, dated Aug. 27, 2021, with English translation (4 pages).
Extended Search Report in European Patent Application No. 21160382.4, mailed May 18, 2021 (10 pages).
Notice of Reasons for Refusal in Japanese Patent Application No. 2017-563216, dated Jan. 27, 2020, with English translation (10 pages).
Office Action in Chinese Patent Application No. 201680043435, dated Aug. 4, 2020, with English summary (16 pages).
Office Action in Chinese Patent Application No. 201680043435.1, mailed Mar. 31, 2021, with English translation (6 pages).
Office Action in Japanese Patent Application No. 2017-563216, dated Oct. 9, 2020, with English translation (9 pages).
Search Report in Chinese Patent Application No. 2016800434351, mailed with Office Action dated Aug. 4, 2020 (2 pages).
IEEE Std 802.11TM 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHZ," The Institute of Electrical and Electronics Engineers, Inc., pp. 1-456 (Sep. 2013).
IEEE P802.11axTM/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
IEEE P802.11nTM D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).
IEEE Std. 802.11nTM "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., pp. 1-535 (Oct. 2009).
IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

(56) References Cited

OTHER PUBLICATIONS

Ansari et al., "Unified MIMO Pre-Coding Based on Givens Rotation," The Institute of Electrical and Electronics Engineers, doc. No. IEEE C802.16e-04/516r2, pp. 1-13, (Jan. 11, 2005).
Chen, "Home Network Basis: Transmission Environments and Wired/Wireless Protocols," Prentice Hall, pp. 1-26 (Jul. 2006).
Hiertz et al., "The IEEE 802.11 Universe," IEEE Communications Magazine, pp. 62-70, (Jan. 2010).
Love et al., "An Overview of Limited Feedback in Wireless Communication Systems," IEEE J. on Selected Areas in Communications, vol. 26, No. 8, pp. 1341-1365 (Oct. 2008).
Mujtaba, "IEEE P802.11—Wireless LANs, TGn Sync Proposal Technical Specification," The Institute of Electrical and Electronics Engineers, Inc., doc.: IEEE 802.11-04/0889r6, pp. 1-131 (May 2005).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Seok et al., "HEW PPDU Format for Supporting MIMO-OFDMA," IEEE 802.11-14/1210r0, 16 pages, (Sep. 14, 2014).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, Institute for Electrical and Electronics Engineers, pp. 1-49, (Jan. 18, 2011).
Van Nee et al. "The 802.11n MIMO-OFDM Standard for Wireless LAN and Beyond," Wireless Personal Communications, vol. 37, pp. 445-453 (Jun. 2006).
Zhang et al., "11ac Explicit Sounding and Feedback", The Institute of Electrical and Electronics Engineers, doc. No. IEEE 802.11-10/1105r0, 44 pages (Sep. 2010).
International Search Report and Written Opinion in International Patent Application No. PCT/US2016/036484, mailed Sep. 22, 2016 (11 pages).
Communication pursuant to Article 94(3) EPC in European Patent Application No. 16730660.4, mailed May 6, 2019 (7 pages).
Communication pursuant to Article 94(3) EPC in European Patent Application No. 21160382.4, mailed Mar. 27, 2023. (5 pages).
Non-Final Notice of Reasons for Allowance for Japanese Patent Application No. 2017-563216 mailed Nov. 22, 2022. (10 pages).
Notice of Reasons for Refusal in Japanese Patent Application No. 2022-001946, dated Nov. 30, 2022, with English translation (6 pages).
First Office Action for Chinese Patent Application No. 2021106389704, mailed on Dec. 5, 2023. (15 pages).
Office Action for Chinese Application No. 202110638970.4, mailed Aug. 30, 2024. (11 pages).
Search Report for Chinese Application No. 202110638970.4, mailed Aug. 30, 2024. (3 pages).
Communication pursuant to Article 94(3) EPC for European Patent Application No. 21160382.4, mailed Mar. 26, 2025. (6 pages).

* cited by examiner

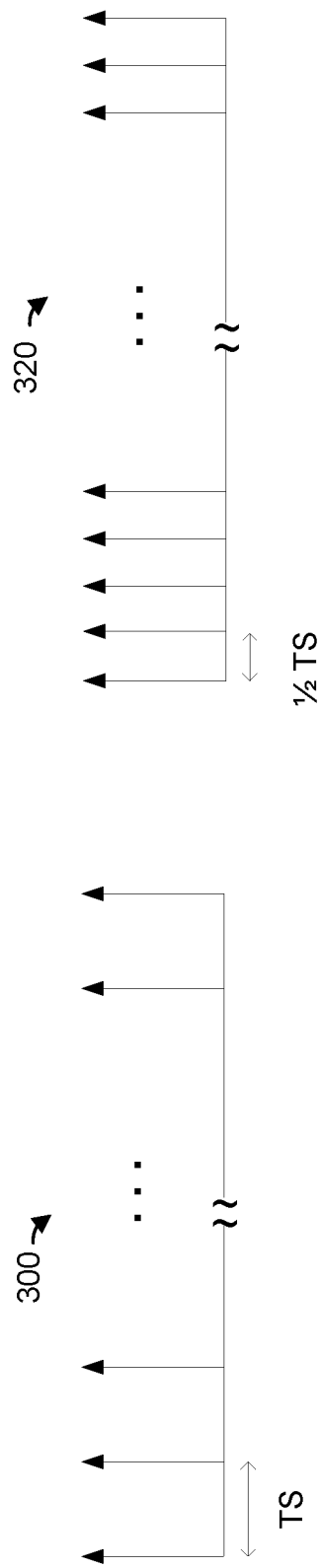
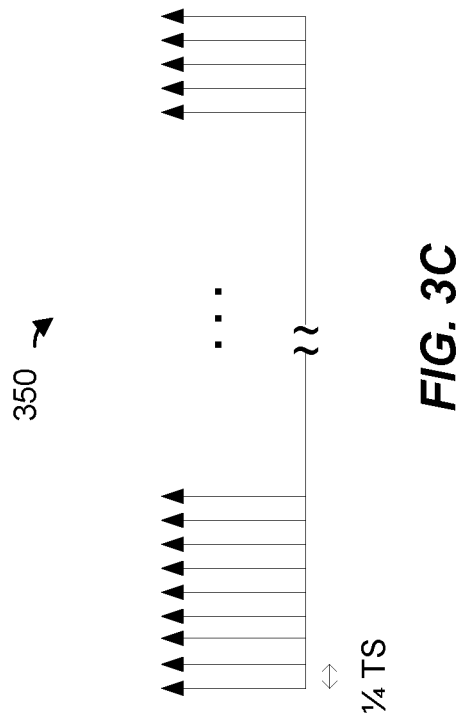
FIG. 3A
FIG. 3B
FIG. 3C

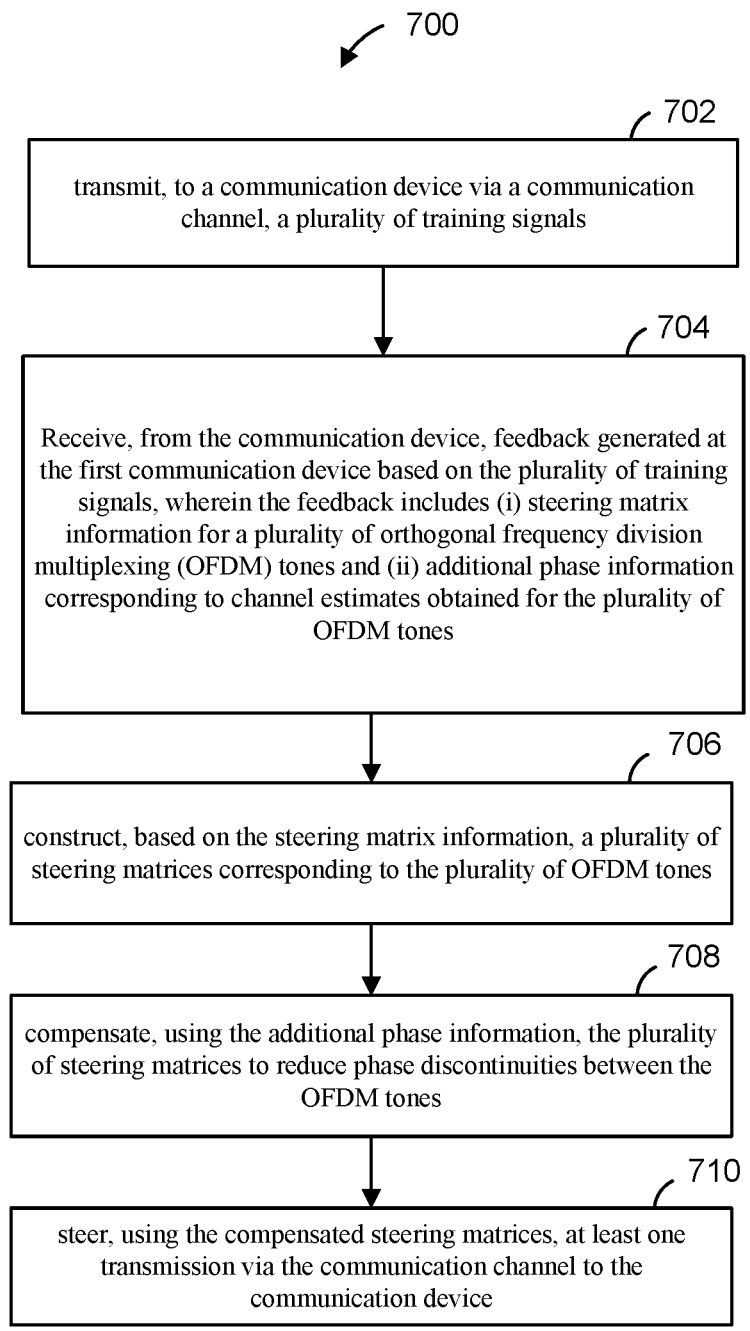

EXPLICIT BEAMFORMING IN A HIGH EFFICIENCY WIRELESS LOCAL AREA NETWORK

CROSS-REFERENCES TO RELATED APPLICATIONS

This application is a continuation of U.S. patent application Ser. No. 17/718,077 (now U.S. Pat. No. 11,831,367), entitled "Explicit Beamforming in a High Efficiency Wireless Local Area Network, filed on Apr. 11, 2022, which is a continuation of U.S. patent application Ser. No. 16/700,562 (now U.S. Pat. No. 11,303,330), entitled "Explicit Beamforming in a High Efficiency Wireless Local Area Network," filed on Dec. 2, 2019, which is a continuation of U.S. patent application Ser. No. 16/173,955 (now U.S. Pat. No. 10,498, 409), entitled "Explicit Beamforming in a High Efficiency Wireless Local Area Network," filed on Oct. 29, 2018, which is a divisional of U.S. patent application Ser. No. 15/176,934 (now U.S. Pat. No. 10,116,359), entitled "Explicit Beamforming in a High Efficiency Wireless Local Area Network," filed on Jun. 8, 2016, which claims the benefit of U.S. Provisional Patent Application Nos. 62/172, 500, filed on Jun. 8, 2015, and 62/244,278, filed Oct. 21, 2015, both entitled "Explicit Beamforming Design for HE-MIMO with Compressed LTF." All of the applications referenced above are incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for communication in a wireless communication network includes: receiving, at a first communication device, a sounding packet from a second communication device, the sounding packet including a first plurality of training orthogonal frequency division multiplexing (OFDM) symbols, the first plurality of training OFDM symbols corresponding to OFDM tones of respective training OFDM symbols, among the first plurality of training OFDM symbols, having been modulated with training signals, wherein each of the respective training OFDM symbols, among the first plurality of training OFDM symbols, has a first time duration, and wherein each training OFDM symbol among the first plurality of training OFDM symbols includes a first number of OFDM tones on which a training signal is modulated; developing, at the first communication device, beamforming information using the first plurality of training OFDM symbols, the beamforming information for the first number of OFDM tones; transmitting, by the first communication device, beamforming feedback to the second communication device, the beamforming feedback including the beamforming information for the first number of OFDM tones, the beamforming information for use by the second communication device to beamsteer a data packet to the first communication device, the data packet having a data portion that includes a second number of OFDM tones greater than the first number of OFDM tones, wherein the beamforming feedback omits beamforming information for a subset OFDM tones in the data portion of the data packet; and after transmitting the beamforming feedback, receiving, at the first communication device, the data packet from the second communication device, the data packet including one or more data OFDM symbols, each of the one or more data OFDM symbols having i) a second time duration that his longer than the first time duration, and ii) the second number of OFDM tones.

In another embodiment, a first communication device comprises a wireless network interface device implemented on one or more integrated circuits (ICs). The one or more ICs are configured to: receive a sounding packet from a second communication device, the sounding packet including a first plurality of training orthogonal frequency division multiplexing (OFDM) symbols, the first plurality of training OFDM symbols corresponding to OFDM tones of respective training OFDM symbols, among the first plurality of training OFDM symbols, having been modulated with training signals, wherein each of the respective training OFDM symbols, among the first plurality of training OFDM symbols, has a first time duration, and wherein each training OFDM symbol among the first plurality of training OFDM symbols includes a first number of OFDM tones on which a training signal is modulated; develop beamforming information using the first plurality of training OFDM symbols, the beamforming information for the first number of OFDM tones; control the wireless network interface device to transmit beamforming feedback to the second communication device, the beamforming feedback including the beamforming information for the first number of OFDM tones, the beamforming information for use by the second communication device to beamsteer a data packet to the first communication device, the data packet having a data portion that includes a second number of OFDM tones greater than the first number of OFDM tones, wherein the beamforming feedback omits beamforming information for a subset OFDM tones in the data portion of the data packet; and after the wireless network interface device transmits the beamforming feedback, receive the data packet from the second communication device, the data packet including one or more data OFDM symbols, each of the one or more data OFDM symbols having i) a second time duration that his longer than the first time duration, and ii) the second number of OFDM tones.

BRIEF DESCRIPTION OF THE DRAWINGS

FIGS. 3A-3C are diagrams illustrating example orthogonal frequency division multiplexing (OFDM) tone spacing used with OFDM symbols of a PHY data unit, according to several embodiments;

FIG. 7 is a flow diagram of an example method for beamforming in a communication channel, according to another embodiment.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi," "HEW" communication protocol, or IEEE 802.11ax communication protocol. In some embodiments, the WLAN supports multiple input multiple output (MIMO) communication in which the AP and/or the client stations include more than one antenna, thereby creating a plurality of spatial (or space-time) streams over which data can be transmitted simultaneously. In an embodiment in which the AP employs multiple antennas for transmission, the AP utilizes various antennas to transmit the same signal while phasing (and amplifying) this signal as it is provided to the various transmit antennas to achieve beamforming or beamsteering. In order to implement a beamforming technique, the AP generally requires knowledge of certain characteristics of the communication channel between the AP and the one or more client stations for which a beamforming pattern is to be created. To obtain channel characteristics, according to an embodiment, the AP transmits to a client station a sounding packet including a number of training fields that allow the client station to accurately estimate the MIMO channel. The client station then transmits or feeds back, in some form, the obtained channel characteristics to the AP, for example by including channel characteristic information in a management or a control frame transmitted to the AP. Upon receiving, from one or more of the client stations, information characterizing the corresponding communication channels, the AP generates desired beam patterns to be used in subsequent transmissions to one or more stations, in various embodiments.

Figure 1:
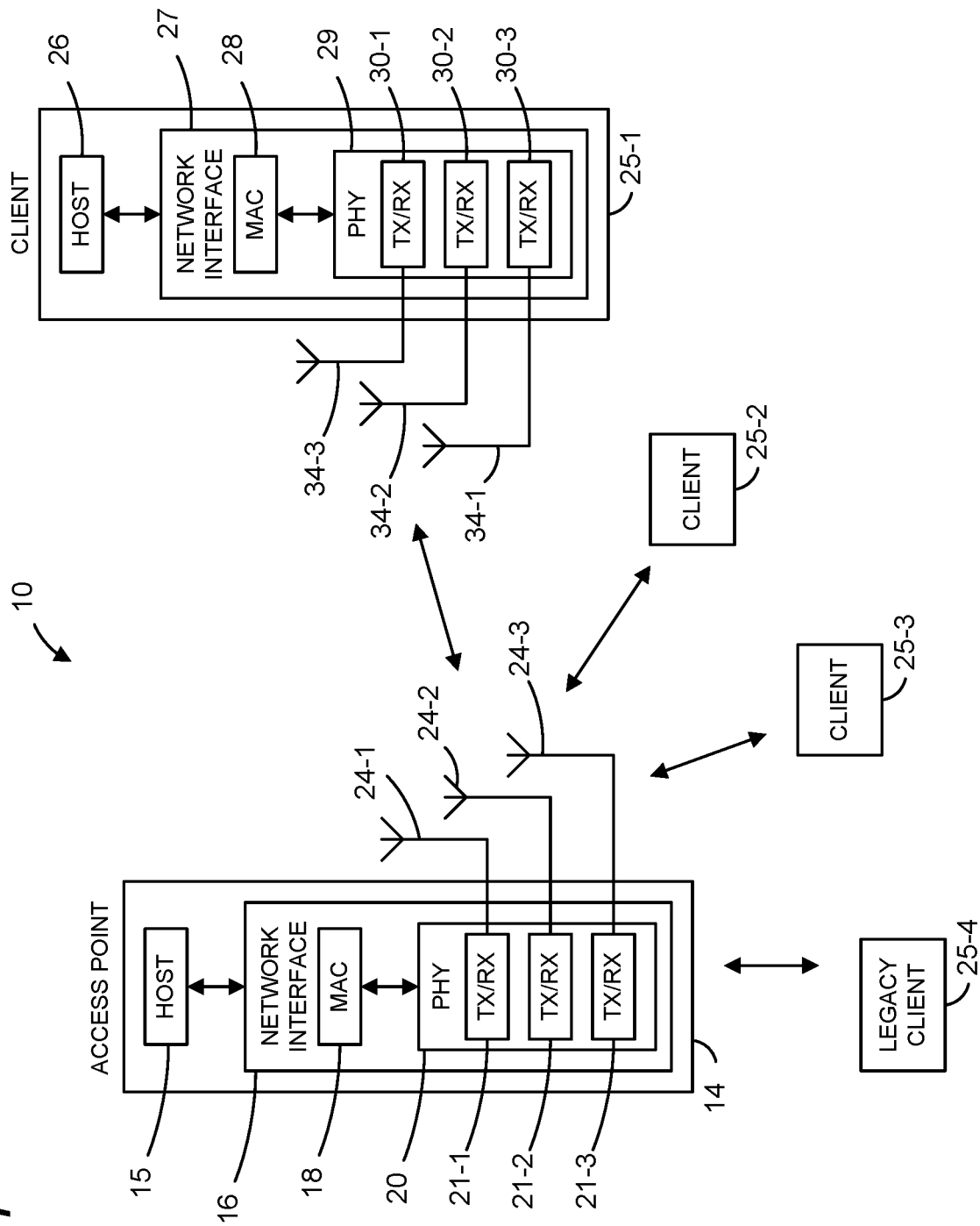
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In an embodiment, the PHY processor 20 scrambles an MPDU (e.g., a PHY service data unit) based on a scramble seed.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

In various embodiments, one or both of the AP 14 and the client device 25-1 are configured to receive OFDM data units that include reduced length MPDUs. In an embodiment, for example, the AP 14 maintains an association of a client station with an allocated sub-channel of the OFDM communication channel such that the AP 14 can generally identify which client station has transmitted an OFDM data unit based on the sub-channel on which the OFDM data unit was received. In another embodiment, the client station 25-1 maintains an association of the AP 14 with the allocated sub-channel such that the client station 25-1 can generally identify which AP has transmitted an OFDM data unit based on the sub-channel on which the OFDM data unit was received.

Figure 2:
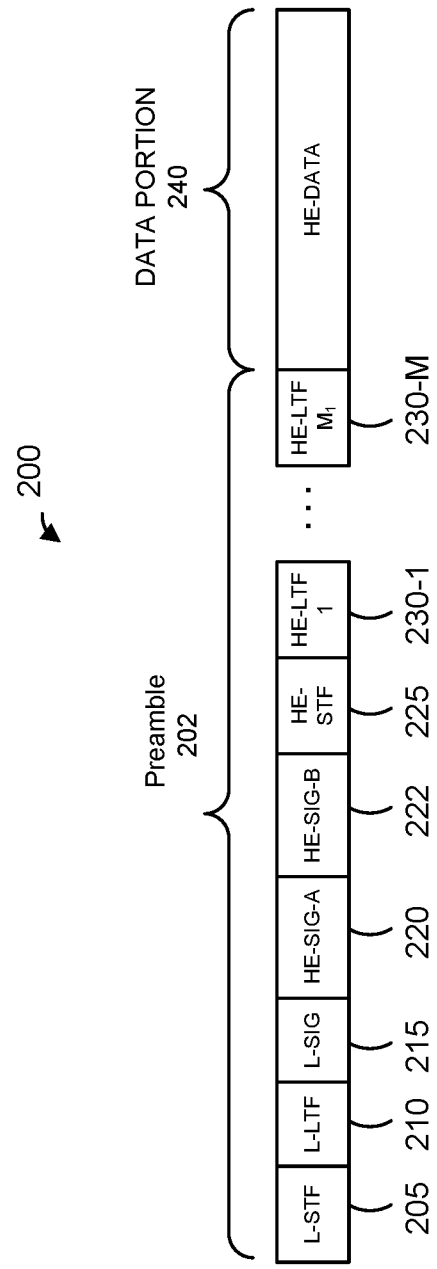
FIG. 2 is a diagram of an example physical layer (PHY) data unit, according to an embodiment.

FIG. 2 is a diagram of a physical layer (PHY) data unit 200 that the AP 14 is configured to transmit to one or more client stations 25 (e.g., the client stations 25-1), according to an embodiment. In an embodiment, one or more client stations 25 (e.g., the client stations 25-1) are also configured to transmit data units the same as or similar to the data unit 200 to the AP 14. The data unit 200 conforms to the HE communication protocol and occupies a 20 MHz bandwidth. Data units similar to the data unit 200 occupy other suitable bandwidths such as 40 MHz, 80 MHz, 160 MHz, 320 MHz, 640 MHz, for example, or other suitable bandwidths, in other embodiments. The data unit 200 is suitable for "mixed mode" situations, i.e., when the WLAN 10 includes a client station (e.g., the legacy client station 24-4) that conforms to a legacy communication protocol, but not the first communication protocol. The data unit 200 is utilized in other situations as well, in some embodiments.

The data unit 200 includes a preamble 202 including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, and M HE long training fields (HE-LTFs) 230, where M is an integer. Each of the L-STF 205, the L-LTF 210, the L-SIG 215, the HE-SIG-A 220, the HE-SIG-B 222, the HE-STF 225, and the M HE-LTFs 230 comprises one or more OFDM symbols. In some embodiments and/or scenarios, the data unit 200 also includes a data portion 240 having one or more OFDM symbols. In some embodiments and/or scenarios, the data unit 200 omits the data portion 240.

In the embodiment of FIG. 2, the data unit 200 includes one of each of the L-STF 205, the L-LTF 210, the L-SIG 215, the HE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, in an embodiment, the data unit occupies an 80 MHz bandwidth and, accordingly, includes four of each of the L-STF 205, the L-LTF 210, the L-SIG 215, the HE-SIG-A 220. In an embodiment in which a data unit similar to the data unit 200 occupies a cumulative bandwidth other than 20 MHz, the HE-SIG-B is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B and the HE data portion occupy the corresponding whole bandwidth of the data unit.

FIGS. 3A-3C are diagrams illustrating OFDM tone spacing used with OFDM symbols of a data unit, such as the data unit 200 of FIG. 2A, in some embodiments. Turning first to FIG. 3A, a tone spacing 300 corresponds to tone spacing defined in a legacy communication protocol. For example, the tone spacing 300 corresponds to the tone spacing defined in the IEEE 802.11ac Standard, in an embodiment. In an embodiment, an OFDM symbol generated with the tone spacing 300 for a particular bandwidth is generated using an Inverse Digital Fourier Transform (IDFT) size that results in a tone spacing (TS) of 312.5 kHz in the particular bandwidth. For example, an OFDM symbol generated with the tone spacing 300 for a 20 MHz bandwidth is generated using a 64-point IDFT, resulting in the tone spacing (TS) of 312.5 kHz, in an embodiment. Similarly, an OFDM symbol generated with the tone spacing 300 for a 40 MHz bandwidth is generated using a 128-point IDFT, an OFDM symbol generated with the tone spacing 300 for an 80 MHz bandwidth is generated using a 256-point IDFT, an OFDM symbol generated with the tone spacing 300 for a 160 MHz bandwidth is generated using a 512-point IDFT, etc., in an embodiment. Alternatively, in some embodiments, an OFDM symbol generated for at least some of the channel bandwidths is generated using an IDFT size that results in a tone spacing (TS) of 312.5 kHz in a sub-band of the entire bandwidth. In such embodiments, multiple sub-bands of the OFDM symbol are individually generated using the IDFT size that results in the tone spacing (TS) of 312.5 kHz in the individual sub-bands. For example, an OFDM symbol for a 160 MHz-wide channel is generated using a 256-point IDFT in each one of the two 80 MHz sub-bands of the 160 MHz-wide channel, in an embodiment.

Turning now to FIG. 3B, a tone spacing 320 is reduced by a factor 2 (½) with respect to the tone spacing 300 of FIG. 3A. For example, continuing with the example above, whereas on OFDM symbol generated with the tone spacing 300 for a 20 MHz bandwidth is generated using a 64-point IDFT, an OFDM symbol generated with the tone spacing 320 for a 20 MHz bandwidth is generated using a 128-point IDFT, resulting in the ½ of the tone spacing 300 of FIG. 3A (i.e., 156.25 kHz). Similarly, an OFDM symbol generated with the tone spacing 320 for a 40 MHz-wide channel is generated using a 256-point IDFT, an OFDM symbol generated with the tone spacing 320 for an 80 MHz bandwidth channel is generated using a 512-point IDFT, an OFDM symbol generated with the tone spacing 320 for a 160 MHz bandwidth channel is generated using a 1024-point IDFT, etc., in an embodiment. Alternatively, in some embodiments, an OFDM symbol generated for at least some of the channel bandwidths is generated using an IDFT size that results in a tone spacing (TS) of 156.25 kHz in a sub-band of the entire bandwidth. In such embodiments, multiple sub-bands of the OFDM symbol are individually generated with the IDFT size that results in the tone spacing (TS) of 312.5 kHz in the individual sub-bands. For example, an OFDM symbol for a 160 MHz bandwidth channel is generated using a 512-point IDFT in each one of the two 80 MHz sub-bands of the 160 MHz bandwidth channel, in an embodiment.

Turning now to FIG. 3C, a tone spacing 350 is reduced by a factor 4 (¼) with respect to the tone spacing 300 of FIG. 3A. For example, continuing again with the example above, whereas an OFDM symbol generated with the tone spacing 300 for a 20 MHz bandwidth is generated using a 64 point IDFT, an OFDM symbol generated with the tone spacing 350 for a 20 MHz bandwidth is generated using a 256 point IDFT, resulting in the ¼ of the tone spacing 300 of FIG. 3A (i.e., 78.125 kHz), in an embodiment. Similarly, an OFDM symbol generated with the tone spacing 350 for a 40 MHz bandwidth channel is generated using a 512-point IDFT, an OFDM symbol generated with the tone spacing 350 for an 80 MHz bandwidth channel is generated using a 1024-point IDFT, an OFDM symbol generated with the tone spacing 350 for a 160 MHz bandwidth channel is generated using a 2048-point IDFT, etc., in an embodiment. Alternatively, in some embodiments, an OFDM symbol generated for at least some of the channel bandwidths is generated using an IDFT size that results in a tone spacing (TS) of 78.125 kHz in a sub-band of the entire bandwidth. In such embodiments, multiple sub-bands of the OFDM symbol are individually generated with the IDFT size that results in the tone spacing (TS) of 312.5 kHz in the individual sub-bands. For example, an OFDM symbol for a 160 MHz bandwidth channel is generated using a 512-point IDFT each one of the 80 MHz sub-bands of the 160 MHz bandwidth channel, in an embodiment. As just another example, an OFDM symbol for a 40 MHz bandwidth channel is generated using a 256-point IDFT in each one of the 20 MHz sub-bands of the 40 MHz bandwidth channel, in an embodiment. As yet another example, in yet another embodiment, an OFDM symbol for an 80 MHz bandwidth channel is generated using a 256-point IDFT in each one of the four 20 MHz sub-bands of the 80 MHz bandwidth channel, in an embodiment.

A tone spacing defined in a legacy communication protocol, such as the tone spacing 300 of FIG. 3A, is sometimes referred to herein as "normal tone spacing" and a tone spacing that is smaller than the tone spacing defined by the legacy communication protocol, such as the tone spacing 320 of FIG. 3B and the tone spacing 350 of FIG. 3C is sometimes referred to herein as "reduced tone spacing."

Generally speaking, symbol duration of an OFDM symbols, in time, is inversely proportional to the tone spacing used with the OFDM symbol. That is, if $\Delta f$ corresponds to the tone spacing used with an OFDM symbol, then the time symbol duration of the OFDM symbol is $T=1/\Delta f$. Accordingly, a relatively smaller tone spacing used with an OFDM symbol results in a relatively larger symbol duration of the OFDM symbol, and vice versa, in an embodiment. For example, a tone spacing of $\Delta f=312.5$ kHz as in FIG. 3A results in an OFDM symbol duration of 3.2 µs, while a tone spacing of $\Delta f=156.25$ kHz as in FIG. 3B results in an OFDM symbol duration of 6.4 µs, in an embodiment. Further, a sampling rate at which a receiving device (e.g., a client station 25 or the AP 14) needs to sample the OFDM symbol is inversely proportional to the IDFT size (number of points) used to generate the OFDM symbol. In particular, in an embodiment, if $N_{fft}$ is the IDFT size used to generate the OFDM symbol, then the sampling rate at which the receiving device needs to sample the OFDM symbol is $T/N_{fft}$, where T is the OFDM symbol duration (T=1/Δf).

In some embodiments, OFDM symbols of the data portion 240 of the data unit 200 are generated with a first tone spacing and OFDM symbols of training fields (e.g., the HE-LTF fields 230) are generated with a second tone spacing larger than the first tone spacing. For example, in an embodiment, OFDM symbols of the training fields 230 of the data unit 200 are generated with the normal tone spacing, while the OFDM symbols of the data portion 240 are generated with the ½ tone spacing or ¼ tone spacing, in an embodiment. In this embodiment, the reduced tone spacing used in the data portion 240 of the data unit 200 increases throughput by allowing transmission of more data symbols in each OFDM symbol of the data portion 240. Further, using the normal tone spacing with the training fields 230 of the data unit 200 results in a reduced overhead compared to a data unit in which the ½ tone spacing or the ¼ tone spacing is used with OFDM symbols of the training fields 230 as well as OFDM symbols of the data portion 240, in an embodiment.

In an embodiment, a receiving device that receives the data unit 200 utilizes the training fields 230 of the data unit 200 to obtain channel estimates that are then used to decode data in the data portion 240 of the data unit 200. In an embodiment in which a greater tone spacing is used with OFDM symbols of the training fields as compared to OFDM symbols of the data portion 240, the receiving device utilizes a suitable technique to obtain channel estimates for those OFDM tones in the data portion 240 that are not present in OFDM symbols of the training fields training fields 230. For example, the receiving device utilizes interpolation, such as linear interpolation or another suitable interpolation technique, to obtain channel estimates for those OFDM tones in the data portion 240 that are not present in OFDM symbols of the training fields training fields 230. As just an example, in an embodiment in which the normal tone spacing is used with OFDM symbols of the training fields 230 and the ½ tone spacing is used with OFDM symbols of the data portion 240, the receiving device uses the training fields 230 to directly obtain channel estimates for every other OFDM tone in the data portion 240. The receiving device interpolates between channel estimates obtained for each pair of adjacent OFDM tones to obtain channel estimates for the additional OFDM tone between corresponding pair of OFDM tones in the data portion 240, in an embodiment. As just another example, in an embodiment in which the normal tone spacing is used with OFDM symbols of the training fields 230 and the ¼ tone spacing is used with OFDM symbols of the data portion 240, the receiving device uses the training fields 230 to directly obtain channel estimates for every fourth OFDM tone in the data portion 240. The receiving device interpolates between channel estimates obtained for each pair of adjacent OFDM tones to obtain channel estimates for the additional three OFDM tones between pairs of OFDM tones in the data portion 240, in an embodiment.

At least some techniques for obtaining channel estimates for OFDM tones in the data portion 240 for which corresponding OFDM tones are missing in the training fields 230 rely on amplitude and phase continuity of the channel response in the communication channel between the transmitting device and the receiving device, in various embodiments. For example, interpolation, such as linear interpolation, relies on continuity of amplitude and phase of the channel response, in an embodiment. However, some discontinuities in the amplitude and/or phase in the communication channel exist, in at least some situations, in an embodiment. For example, beamforming used by the transmitting device to steer transmissions to the receiving device results in amplitude and/or phase discontinuities in the communication channel, in at least some embodiments. Such discontinuities degrade receiver performance for example because interpolated channel estimates do not accurately reflect the communication channel, in an embodiment. As described in more detail below, such discontinuities are reduced using additional beamforming feedback, in various embodiments.

Generally speaking, to perform transmit beamforming, the AP relies upon knowledge of the downlink channel between the AP and the client station. In an embodiment, the downlink channel knowledge is obtained through explicit beamforming, where the client device receives a sounding packet from the AP, develops channel estimates of the downlink channel based on the sounding packet received from the AP, and transmits the channel estimates, or steering information determined based on the channel estimates, back to the AP. Explicit beamforming uses one of three types of feedback channel descriptions, in various embodiments. With channel state information (CSI) feedback, in an embodiment, the client station estimates the channel (e.g., determines a channel matrix) based on the sounding packet received from the AP and feeds estimated channel matrix back to the AP, in an embodiment. With noncompressed steering matrix feedback, in an embodiment, the client station, based on the channel estimate from a sounding packet from the AP, determines a steering matrix that is to be used at the AP. The client station then feeds the steering matrix, without compression, back to the AP. With compressed steering matrix feedback, a similar process occurs, but the steering matrix is fed back in a compressed form.

Figure 4:
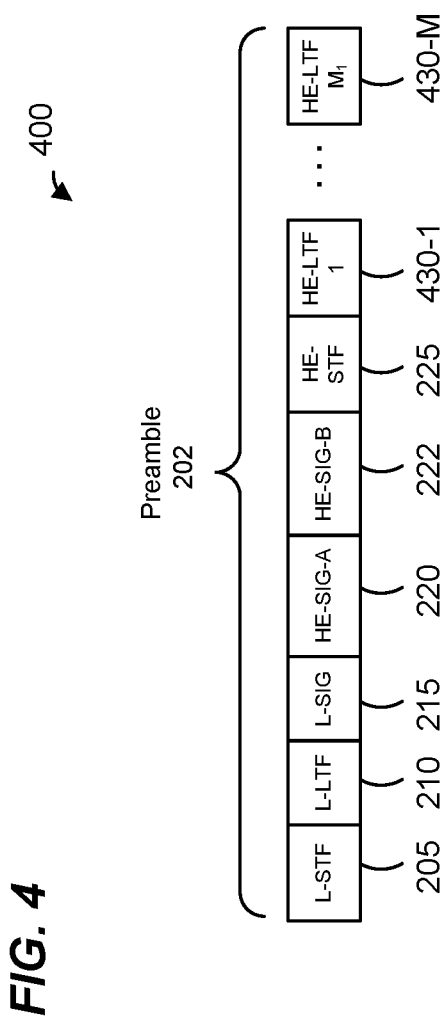
FIG. 4 is a diagram of an example sounding packet, according to an embodiment.

FIG. 4 is a block diagram of a sounding packet 400 that the AP 14 is configured to transmit to a client station 25 (e.g., the client station 25-1) to sound the communication channel between the AP 14 and the client station 25-1, according to an embodiment. In an embodiment, the client station 25-1 utilizes the sounding packet 400 to obtain channel estimates and to generate feedback based on the channel estimates. The client station 25-1 transmits the feedback, generated based on the sounding packet 400, to the AP 14. The AP 14 receives the feedback, generated based on the sounding packet 400, from the client station 25-1, and generates, based on the feedback, a steering matrix to be used for transmission to the client station 25-1 from the AP 14. The AP 14 utilizes the steering matrix to transmit at least one data unit, such as the data unit 200 of FIG. 2, to the client station 25-1, in an embodiment.

The sounding packet 400 is similar to the data unit 200 of FIG. 2 and includes some of the same elements with the data unit 200 of FIG. 2. The sounding packet 400 includes a plurality of LTFs 430, in an embodiment. In an embodiment, the LTFs 430 correspond to the LTFs 230 of the data unit 200 of FIG. 2. In an embodiment, the LTFs 430 are generated with a tone spacing that is different from the tone spacing used in the data portion 240 of the data unit 200. For example, in an embodiment, whereas OFDM symbols of the data portion 240 of the data unit 200 are generated with the ½ tone spacing illustrated in FIG. 3B or the ¼ tone spacing illustrated in FIG. 3C, OFDM symbols of the LTFs 430 of the sounding packet 400 are generated with the normal tone spacing illustrated in FIG. 3A. As another example, in another embodiment, whereas OFDM symbols of the data portion 240 of the data unit 200 are generated with the ¼ tone spacing illustrated in FIG. 3C, OFDM symbols of the LTFs 430 of the sounding packet 400 are generated with the ½ tone spacing illustrated in FIG. 3B. In other embodiments, OFDM symbols of the LTFs 430 of the sounding packet 400 and/or OFDM symbols of the data portion 240 of the data unit 200 are generated using other suitable tone spacings. In one embodiment, OFDM symbols of the LTFs 430 of the sounding packet 400 and OFDM symbols of the data portion 240 of the data unit 200 are generated with a same tone spacing.

In an embodiment, the sounding packet 400 is a non-data packet (NDP) that omits a data portion. In another embodiment, the sounding packet 400 includes a data portion.

The client station 25-1 receives the sounding packet 400 transmitted by the AP 14, and determines a channel description based on the LTFs 430 of the sounding packet 400, in an embodiment. In an embodiment, the channel description includes channel gain parameters (which may be complex numbers) for various streams within the communication channel between the AP 14 and the client station 25-1. In some embodiments, the channel description is represented in a matrix form. For example, the channel description includes channel gain parameters (which may be complex numbers) for various streams defined, at the one end, by the array including the antennas 24-1, 24-2, and 24-3 of AP 14 and, at the other end, by the array including the antennas 34-1, 34-2, and 34-3 of the client station 25-1, in an embodiment. In this embodiment, the channel description may be represented by a three-by-three channel matrix H that specifies, in each element, a channel gain parameter for a stream defined by the corresponding transmit antenna and a receive antenna. In an embodiment, the client station 25-1 determines a respective channel description (e.g., channel matrix) for each OFDM tone of the LTFs 430. Thus, channel description determined by the client station 25-1 includes multiple channel matrices, each channel matrix corresponding to a particular OFDM tone of the LTFs 430, in an embodiment.

Based on the plurality of channel matrices H, the client station 25-1 determines a plurality of beamforming feedback matrices V that are then fed back, in some form (e.g., uncompressed or compressed form) fed back to the AP 14, in an embodiment. The client station 25-1 utilizes any suitable technique for determining a beamforming feedback matrix V based on a channel matrix H for each OFDM tone for which a channel matrix was determined, in an embodiment. For example, the client station 25-1 utilizes singular value decomposition (SVD) to decompose the channel matrix H into a left singular value matrix, a diagonal singular value matrix, and a right singular value matrix. In an embodiment, SVD of a matrix $H_i$ corresponding to the i-th OFDM tone can be represented by $$H_i = U_i \cdot \Lambda_i \cdot V_i^H \quad \text{Equation 1}$$

where $V_i$ is the beamforming feedback matrix for the i-th OFDM tone. In other embodiments, other suitable techniques for generating steering vectors based on channel estimates may be used in place of SVD.

Figure 5:
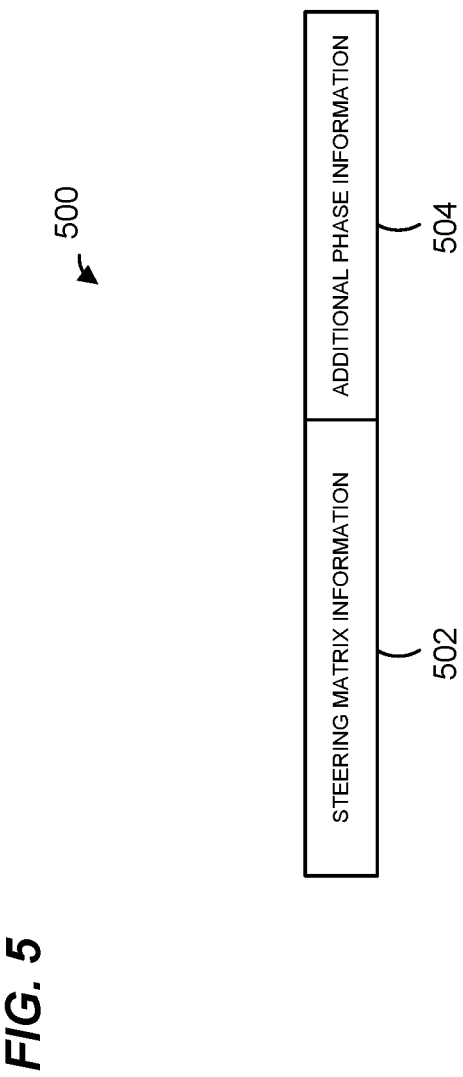
FIG. 5 is a diagram of an example beamforming feedback, according to an embodiment.

FIG. 5 is a diagram of an example beamforming feedback 500 generated by the client station 25-1, according to an embodiment. Generally speaking, beamforming feedback generated by the client station 25-1 includes information that will allow the AP 14 to construct steering matrices $Q_i$ that can then be applied to steer transmission to the client station 25-1 to the AP 14. In an embodiment, the beamforming feedback 500 includes steering matrix information 502 and additional phase information 504. In various embodiments, the steering matrix information 502 includes suitable representations of the beamforming matrices $V_i$, in noncompressed or compressed form. In an embodiment in which noncompressed beamforming feedback is used, the steering matrix information 502 includes representations of elements of the beamforming matrices $V_i$. For example, in an embodiment the steering matrix information 502 includes quantized versions of the elements of the beamforming feedback matrices $V_i$.

In an embodiment in which compressed beamforming matrix is used, the steering matrix information 502 includes quantized angles that represent the elements of the beamforming feedback matrices $V_i$. In an embodiment, to compress a steering matrix $V_i$, the client station 25-1 rotates phases of elements of a row (e.g., the last row) of the steering matrix $V_i$ such that the row of the steering matrix $V_i$ become non-negative real numbers, i.e., with phases equal to zero. The client station 25-1 then decomposes the steering matrix $V_i$ (with non-negative real numbers in the rotated row) into a plurality of matrices that cause elements of columns of the steering matrix V to become non-negative real numbers. For example, to decompose the steering matrix $V_i$, the client station 25-1 implements a Givens rotation algorithm that iteratively rotates columns of the steering matrix $V_i$ to cause columns of the steering matrix $V_i$ (with non-negative real numbers in the rotated row) to become non-negative real numbers, i.e., with phases equal to zero. In an embodiment, the client station 25-1 generates the steering matrix information 502 to include representations of rotation angles (e.g., ψ angles and φ angles) that result from the decomposition of each steering matrix $V_i$, in an embodiment. For example, the client station 25-1 generates the steering matrix information 502 to include quantized versions of rotation angles (e.g., ψ angles and φ angles) that result from the decomposition of each steering matrix $V_i$, in an embodiment.

The additional phase information 504 includes additional information to be used by the AP 14 to compensate steering matrices generated at the AP 14 based on the steering matrix information 502, according to an embodiment. In an embodiment, the AP 14 compensates steering matrices generated at the AP 14 based on the steering matrix information 502 to reduce phase discontinuities in the communication channel when transmissions are steered to the client station 25-1 to the AP 14. In an embodiment, corresponding to each OFDM tone for which beamforming feedback matrix information is included in the steering matrix information 502, the additional phase information 504 includes phase components of elements of a row (e.g., the first row) of the corresponding matrix $U_i$ in Equation 1, in an embodiment. For example, in an embodiment, the additional phase information includes angles $\Phi_i$ calculated according to $$\Phi_i = \text{angle}(U_{i_0,0}, U_{i_0,1}, \ldots, U_{i_0,N-1}) \quad \text{Equation 2}$$

where $$U_{i_0,j}$$

is the element in the first row and j-th column of the matrix $U_i$, and where N is the number of columns in the matrix $U_i$. Additionally, in an embodiment in which compressed beamforming feedback is used, the additional phase information 504 includes, corresponding to each OFDM tone for which beamforming feedback matrix information is included in the steering matrix information 502, phase components of elements of the row (e.g., the last row) of the matrix $V_i$ corresponding to the OFDM tone. For example, in an embodiment, the additional phase information includes angles $\theta_i$ calculated according to $$\theta_i = \text{angle}(V_{i_{N-1,0}}, V_{i_{N-1,1}}, \ldots, V_{i_{N-1,N-1}}) \quad \text{Equation 3}$$

where $$V_{i_{N-1,j}}$$

is the element in the last row and j-th column of the matrix $V_i$, and where N is the number of columns in the matrix $V_i$.

In some embodiments, the client station 25-1 performs additional processing of the beamforming feedback matrices $V_i$ before sending the beamforming feedback matrix information to the AP 14. In such embodiments, the steering matrix information 502 includes noncompressed or compressed representations of the processed beamforming feedback matrices $V_i$. For example, the client stations 25-1 implements a smoothing technique to smooth beamforming feedback matrices $V_i$ across a number of neighboring OFDM tones. In an embodiment, the client station 25-1 implements smoothing with phase roll compensation to smooth the beamforming feedback $V_i$ over an integer number N of OFDM tones according to $$V(n) = \sum_{k=-(N+1)/2}^{(N-1)/2} w_k V(n+k) e^{-j(k\alpha)} \quad \text{Equation 4}$$

where $w_k$ is a weighting factor, and the phase factor $\alpha$ is a phase roll compensation factor. In an embodiment, the weighting factor $w_k$ is set to 1/N. In this embodiment, beamforming feedback matrices are averaged across the N OFDM tones. In other embodiments, other weighting factors are used. In an embodiment in which phase roll compensation is not used, the client station 25-1 implements smoothing using equation 4 with the phase factor angle factor $\alpha$ set to zero. In other embodiments, other suitable values of the phase factor $\alpha$ are used.

The AP 14 receives the feedback from the client station 25-1, and determines, based on the received feedback, steering matrices $Q_i$ to be used for transmission to the client station 25-1, in an embodiment. In an embodiment, the AP 14 reconstructs steering matrices based on the steering matrix information included in the feedback. In an embodiment, the AP 14 constructs an initial steering matrix $Q_{0i}$ corresponding to each OFDM tone for which beamforming feedback matrix is included in the beamforming feedback received from the client station 25-1. The AP 14 constructs the initial steering matrix $Q_{0i}$ corresponding to a particular OFDM based on the steering matrix information, included in the beamforming feedback, corresponding to the particular OFDM tone, in an embodiment. For example, in the case of noncompressed feedback, the AP 14 reconstructs each beamforming feedback matrix $V_i$ directly based on the representation of the beamforming feedback matrix $V_i$ included in the feedback, and constructs the initial steering matrix $Q_{0i}$ by setting the initial steering matrix $Q_{0i}$ to be equal to the reconstructed beamforming feedback matrix $V_i$. In the case of compressed feedback, in an embodiment, the AP 14 reverses compression process to reconstruct the uncompressed beamforming feedback matrix $V_i$ based on representations of rotation angles (e.g., $\psi$ angles and $\varphi$ angles) that resulted from the compression of the matrix $V_i$, and sets the initial steering matrix $Q_{0i}$ to be equal to the corresponding reconstructed uncompressed beamforming feedback matrix $V_i$.

In an embodiment, the AP 14 compensates the initial matrices $Q_{0i}$ using the additional phase information 504 included in the feedback 500. In an embodiment, in the case of compressed beamforming feedback, the AP 14 compensates the initial steering matrices $Q_{0i}$ using the $\theta_i$ angles included in the additional phase information 504. In an embodiment, the AP 14 compensates the initial steering matrices $Q_{0i}$ using the $\theta_i$ angles according to $$Q_i = Q_{0i} \text{diag}(e^{j\theta_i}) \quad \text{Equation 5}$$

the AP 14 further compensates the steering matrices $Q_i$ using $\Phi_i$ angles included in the additional phase information 504, in an embodiment. In an embodiment, the AP 14 further compensates the steering matrices $Q_i$ using $\Phi_i$ angles according to $$Q_i = Q_i \text{diag}(e^{j\Phi_i}) \quad \text{Equation 6}$$

In an embodiment in which the beamforming feedback matrix information includes noncompressed beamforming matrix information, the AP 14 directly compensates the reconstructed steering matrices $Q_{0i}$ using $\Phi_i$ angles included in the additional phase information 504. In an embodiment, the AP 14 directly compensates the reconstructed steering matrices $Q_{0i}$ using $\Phi_i$ angles according to $$Q_i = Q_{0i} \text{diag}(e^{j\Phi_i}) \quad \text{Equation 7}$$

As discussed above, the AP 14 generates steering matrices $Q_i$ corresponding to OFDM tones for which feedback information is included in the feedback 500, in an embodiment. As also discussed above, a data unit such as the data unit 200 that is to be steered based on the feedback 500 includes additional OFDM tones corresponding to which feedback is not included in the feedback 500, in some embodiments. For example, whereas the feedback 500 is generated based on OFDM symbols of LTFs 430 having a first tone spacing corresponding to a first number of OFDM tones, OFDM tones of the data portion 240 are generated with a second tone spacing that is less than the first tone spacing (e.g., second tone spacing is ½ or ¼ of the first tone spacing) corresponding to a second number of OFDM tones that is greater than the first number of OFDM tones, in some embodiments. In such embodiments, the AP 14 generates steering matrices for the OFDM tones for which feedback information is not included in the beamforming feedback 500 using the steering matrices generated based on the beamforming feedback 500. For example, in an embodiment, the AP 14 utilizes interpolation to interpolate between steering matrices $Q_i$, corresponding to adjacent OFDM tones for which feedback was included in the beamforming feedback 500. In an embodiment, linear interpolation is used to interpolate between steering matrices $Q_i$. In an embodiment, linear interpolation with phase roll compensation is used to interpolate between steering matrices $Q_i$ For example, in an embodiment in which the second tone spacing used in the data portion 240 is ½ of the tone spacing used in the OFDM symbols of the LTFs 430, the AP 14 interpolates between steering matrices $Q_i$, corresponding to neighboring OFDM tones p according to $$Q(2p+q)=[Q(2p)+Q(2p+2)\cdot e^{-jqw}]/2 \quad \text{Equation 8}$$

where q={0,1} and w is a phase roll.

As another example, in an embodiment in which the second tone spacing used in the data portion 240 is ¼ of the tone spacing used in the OFDM symbols of the LTFs 430, the AP 14 interpolates between steering matrices $Q_i$, corresponding to neighboring OFDM tones p according to $$Q(4p+q)=[Q(4p)+Q(4p+4)\cdot e^{-jqw}]/2 \quad \text{Equation 9}$$

where q={0, 1, 2, 3} and w is a phase roll compensation factor.

In some embodiments, interpolation is performed at the client station 25-1 rather than at the AP 14. For example, the client station 25-1 interpolates between beamforming feedback matrices $V_i$ to generate additional beamforming feedback matrices $V_i$ corresponding to OFDM that are to be used for transmission of data to the client station 25-1 but that are missing in the LTFs 430 of the sounding packet 400 based on which beamforming feedback matrices $V_i$ are generated by the client station 25-1, in an embodiment. For example, in some embodiments, the client station 25-1 utilizes equations same as or similar to Equations 8 and 9 to generate the additional beamforming feedback matrices by interpolated between the beamforming feedback matrices $V_i$ obtained for adjacent OFDM tones in OFDM symbols of the LTFs 430, in an embodiment.

The client station 25-1 includes representations of the additional beamforming feedback matrices $V_i$ in the feedback 500, in an embodiment. For example, the steering matrix information of the feedback 500 includes (i) representations of the beamforming feedback matrices $V_i$ that are generated based of the LTFs 430 of the sounding packet 400 and (ii) representations of the additional beamforming feedback matrices that generated based on (e.g., interpolated from) the beamforming feedback matrices $V_i$ that are generated based of the LTFs 430 of the sounding packet 400, in some embodiments. In such embodiments, the AP 14 constructs steering matrices corresponding to OFDM tones of OFDM symbols of a data portion of a data unit to be transmitted to the client station 25-1, such as the data portion 240 of the data unit 200, based on the steering matrix information 502 of the feedback 500. In some such embodiments, the additional phase information 504 is omitted from the steering matrix 500.

In some embodiments, to reduce amount of feedback transmitted from the client stations 25-1 to the AP 14, the client station 25-1 transmits beamforming feedback information corresponding to only a subset of OFDM tones of OFDM symbols of a data portion of a data unit to be transmitted to the client station 25-1. For example, the client station 25-1 transmits beamforming feedback information corresponding to one OFDM tone in each group of Ng adjacent OFDM tones of OFDM symbols of a data portion of a data unit to be transmitted to the client station 25-1. In an embodiment, the number Ng of OFDM tones in the group of OFDM tones is configurable. For example, in an embodiment, the client station 25-1 configures the number Ng of OFDM tones in the group of OFDM tones. In another embodiment, the AP 14 configures the number Ng of OFDM tones in the group of OFDM tones, and signals the number Ng to the client station 25-1. In an embodiment, the number Ng of OFDM tones in the group of OFDM tones is configured based on one or more metrics associated with the communication channel between the client station 25-1 and the AP 14, such as channel conditions (e.g., signal to noise ratio), channel throughput, error rate, etc. In some embodiments, the number Ng of OFDM tones in the group of OFDM tones is additionally or alternatively configured based on capabilities of the client station 25-1 and/or of the AP 14.

In an embodiment, the AP 14 uses the generated steering matrices to steer at least one transmission to the client station 25-1 to the AP 14. For example, in an embodiment, the AP 14 applies the steering matrices to OFDM tones of OFDM symbols in a data portion of a data unit, such as the data portion 240 of the data unit 200, transmitted to the client station 25-1 to the AP 14.

In an embodiment, the client station 25-1 receives a data unit, such as the data unit 200, to which beamforming was applied at the AP 14. In some embodiments, the client station 25-1 utilizes the training fields 230 of the data unit 200 to obtain a channel estimate that is then used to decode data in the data portion 240 of the data unit 200. In an embodiment in which a greater tone spacing is used with OFDM symbols of the training fields as compared to OFDM symbols of the data portion 240, the receiving device utilizes a suitable technique to obtain channel estimates for those OFDM tones in the data portion 240 that are not present in OFDM symbols of the training fields training fields 230. In an embodiment, the client station 25-1 utilizes a suitable smoothing technique to smooth channel estimates across multiple neighboring OFDM tones. For example, the client station 25-1 averages channel estimates corresponding to the multiple OFDM tones. As discussed above, in at least some embodiment, beamforming the data unit 200 causes phase and/or amplitude discontinuities when the data unit 200 is transmitted via a communication channel. In some embodiments, the client station 25-1 detects phase and/or amplitude jumps between adjacent OFDM tones, and to omit from channel smoothing those OFDM tones that experience phase and/or amplitude jumps. For example, in an embodiment, the client station 25-1 omits from channel smoothing an OFDM tones for which a difference between phase and/or amplitude of channel estimate corresponding to the OFDM tone and phase and/or amplitude of channel estimate corresponding to the adjacent OFDM tone exceeds a threshold.

Figure 6:
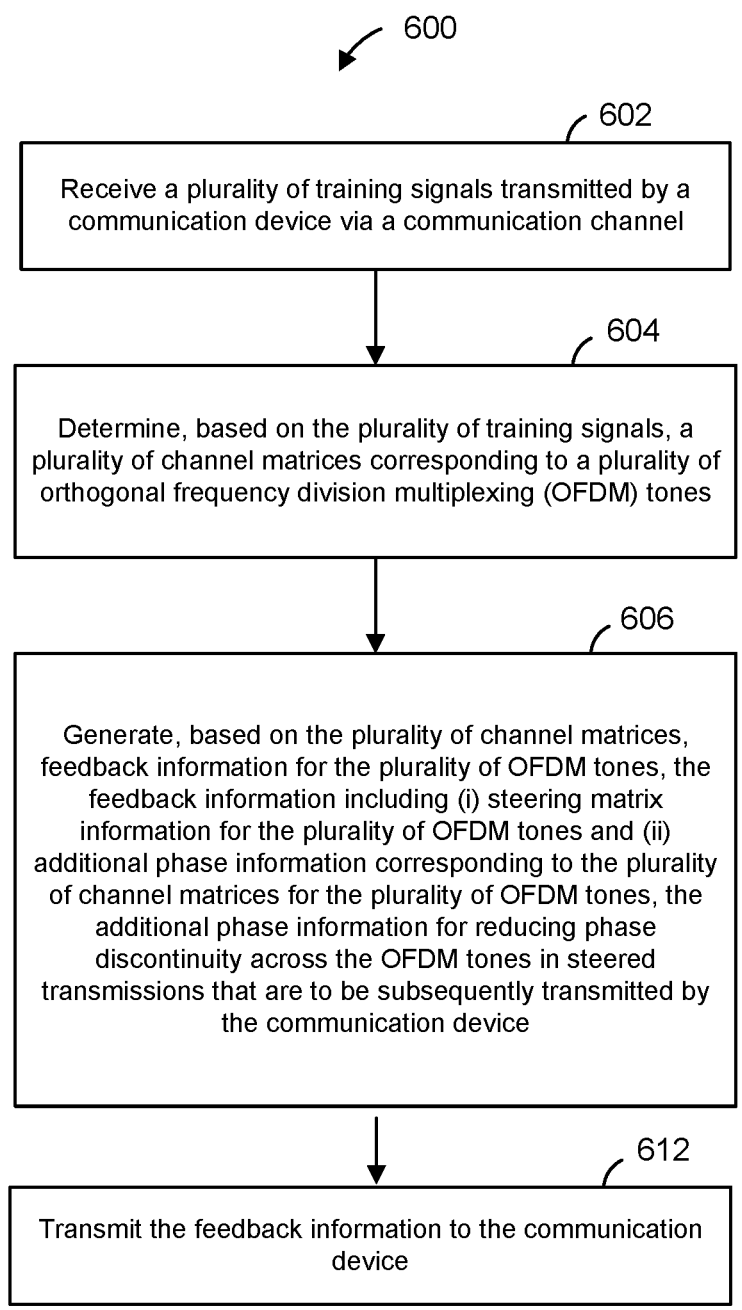
FIG. 6 is a flow diagram of an example method for beamforming in a communication channel, according to another embodiment.

FIG. 6 is a flow diagram of an example method 600 for beamforming in a communication channel, according to an embodiment. With reference to FIG. 1, the method 600 is implemented by the network interface device 16, in an embodiment. For example, in one such embodiment, the PHY processor 20 is configured to implement the method 600. According to another embodiment, the MAC processing 18 is also configured to implement at least a part of the method 600. With continued reference to FIG. 1, in yet another embodiment, the method 600 is implemented by the network interface device 27 (e.g., the PHY processor 29 and/or the MAC processor 28). In other embodiments, the method 600 is implemented by other suitable network interface devices.

At block 602, a plurality of training signals is received. In an embodiment, a sounding packet is received, wherein the sounding packet includes the plurality of training signals. In an embodiment, the sounding packet 400 of FIG. 4 is received. In an embodiment, the training signals correspond to LTFs 403 of the sounding packet 400. In another embodiment, a suitable sounding packet different from the sounding packet 400 is received.

At block 604, a plurality of channel matrices corresponding to a plurality of OFDM tones are determined. In an embodiment, the plurality of channel matrices is determined based on the plurality of training signals received at block 602. In an embodiment, the plurality of channel matrices is determined based on LTFs of a sounding packet received at block 602. In an embodiment, the plurality of channel matrices corresponds to the plurality of OFDM tones of OFDM symbols of LTFs of a sounding packet received at block 602.

At block 606, beamforming feedback is generated based on the plurality of steering matrices received at block 604. In an embodiment, the beamforming feedback 500 is generated. In another embodiment, beamforming feedback different from the beamforming feedback 500 is generated. In an embodiment, the beamforming feedback information includes i) steering matrix information for the plurality of OFDM tones and (ii) additional phase information corresponding to the plurality of channel matrices for the plurality of OFDM tones. In an embodiment, the additional phase information is for reducing phase discontinuity across the OFDM tones in steered transmissions that are to be subsequently transmitted by the communication device.

At block 608, the beamforming feedback is transmitted to the communication device.

FIG. 7 is a flow diagram of an example method 700 for beamforming in a communication channel, according to an embodiment. With reference to FIG. 1, the method 700 is implemented by the network interface device 16, in an embodiment. For example, in one such embodiment, the PHY processor 20 is configured to implement the method 700. According to another embodiment, the MAC processing 18 is also configured to implement at least a part of the method 700. With continued reference to FIG. 1, in yet another embodiment, the method 700 is implemented by the network interface device 27 (e.g., the PHY processor 29 and/or the MAC processor 28). In other embodiments, the method 700 is implemented by other suitable network interface devices.

At block 702, a plurality of training signals is transmitted to a communication device. In an embodiment, a sounding packet is transmitted, wherein the sounding packet includes the plurality of training signals. In an embodiment, the sounding packet 400 of FIG. 4 is transmitted. In an embodiment, the training signals correspond to LTFs 403 of the sounding packet 400. In another embodiment, a suitable sounding packet different from the sounding packet 400 is transmitted.

At block 704, feedback is received from the communication device. In an embodiment, the received feedback corresponds to feedback generated by the communication device based on the plurality of training signals transmitted to the communication device at block 702. In an embodiment, the feedback received at block 704 corresponds to the feedback 500 of FIG. 5. In another embodiment, the feedback received at block 704 corresponds to suitable feedback different from the feedback 500 of FIG. 5. In an embodiment, the feedback received at block 704 includes (i) steering matrix information for a plurality of OFDM tones and (ii) additional phase information corresponding to channel estimates obtained for the plurality of OFDM tones.

At block 706, a plurality of steering matrices corresponding to the plurality of OFDM tones is constructed. In an embodiment, the plurality of steering matrices is constructed based on the feedback received at block 704. In an embodiment, the plurality of steering matrices is constructed based on the steering matrix information included in the feedback received at block 704. At block 708, the steering matrices of the plurality of steering matrices constructed at block 706 are compensated are compensated to reduce phase discontinuities across the plurality of OFDM tones. In an embodiment, the steering matrices of the plurality of steering matrices are compensated based on the additional phase information included in the beamforming feedback received at block 704.

At block 710, the plurality of compensated steering matrices is used to steer at least one transmission to the communication device.

In an embodiment, a method for beamforming training includes: receiving, at a first communication device from a second communication device via a communication channel, a plurality of training signals; determining, at the first communication device based on the plurality of training signals, a plurality of channel matrices corresponding to a plurality of orthogonal frequency division multiplexing (OFDM) tones; generating, at the first communication device based on the plurality of channel matrices, feedback information for the plurality of OFDM tones, the feedback information including (i) steering matrix information for the plurality of OFDM tones and (ii) additional phase information corresponding to the plurality of channel matrices for the plurality of OFDM tones, the additional phase information for reducing phase discontinuity across the OFDM tones in steered transmissions that are to be subsequently transmitted from the second communication device to the first communication device; and transmitting the feedback information from the first communication device to the second communication device.

In other embodiments, the method includes one of, or any suitable combination of two or more of, the following features.

Generating feedback information for a particular OFDM tone of the plurality of OFDM tones includes: decomposing a channel matrix corresponding to a particular OFDM tone into a plurality of matrices including at least a first matrix and a second matrix, generating the steering matrix information to include representations of elements of the first matrix, and generating the additional phase information to include phase components of at least some elements of the second matrix.

Generating the additional phase information comprises generating the additional phase information to include phase components of elements of a row of the second matrix.

The row of the second matrix is the first row of the second matrix.

Generating feedback information for a particular OFDM tone of the plurality of OFDM tones comprises: decomposing the channel matrix corresponding to the particular OFDM tone into a plurality of matrices including at least a first matrix and a second matrix, compressing the second matrix to generate a plurality of angles, generating the steering matrix information to include representations of the plurality of angles, and generating the additional phase information to include (i) representations of phase components of at least some elements of the first matrix and (ii) representations of phase components of at least some elements of the second matrix.

Generating the additional phase information comprises generating the additional phase information to include (i) representations of phase components of elements of a first row of the first matrix and (ii) representations of phase components of elements a last row of the second matrix.

Generating feedback information for the plurality of OFDM tones includes: generating, based on the plurality of channel matrices, a plurality of beamforming feedback matrices corresponding to the plurality of OFDM tones, generating, based on the plurality of beamforming feedback matrices, a plurality of smoothed beamforming feedback matrices corresponding to the plurality of OFDM tones, including generating a particular smoothed beamforming feedback matrix corresponding to a particular OFDM tone using beamforming feedback matrices corresponding to OFDM tones within a window of N OFDM tones around the particular OFDM tones, wherein N is an integer greater than one, and generating the steering matrix information feedback based on the plurality of smoothed beamforming feedback matrices.

In another embodiment, an apparatus comprises: a network interface device has one or more integrated circuits. The one or more integrated circuits are configured to: receive a plurality of training signals transmitted be a communication device via a communication channel; determine, based on the plurality of training signals, a plurality of channel matrices corresponding to a plurality of orthogonal frequency division multiplexing (OFDM) tones; generate, based on the plurality of channel matrices, feedback information for the plurality of OFDM tones, the feedback information including (i) steering matrix information for the plurality of OFDM tones and (ii) additional phase information corresponding to the plurality of channel matrices for the plurality of OFDM tones, the additional phase information for reducing phase discontinuity across the OFDM tones in steered transmissions that are to be subsequently transmitted by the communication device; and transmit the feedback information to the communication device.

In other embodiments, the apparatus includes one of, or any suitable combination of two or more of, the following features.

The one or more integrated circuits are further configured to: decompose a channel matrix corresponding to a particular OFDM tone into a plurality of matrices including at least a first matrix and a second matrix, generate the steering matrix information to include representations of elements of the first matrix, and generate the additional phase information to include phase components of at least some elements of the second matrix.

The one or more integrated circuits are configured to generate the additional phase information to include phase components of elements of a row of the second matrix.

The row of the second matrix is the first row of the second matrix.

The one or more integrated circuits are configured to: decompose the channel matrix corresponding to the particular OFDM tone into a plurality of matrices including at least a first matrix and a second matrix, compress the second matrix to generate a plurality of angles, generate the steering matrix information to include representations of the plurality of angles, and generate the additional phase information to include (i) representations of phase components of at least some elements of the first matrix and (ii) representations of phase components of at least some elements of the second matrix.

The one or more integrated circuits are configured to generate the additional phase information to include (i) representations of phase components of elements of a first row of the first matrix and (ii) representations of phase components of elements a last row of the second matrix.

The one or more integrated circuits are further configured to: generate, based on the plurality of channel matrices, a plurality of beamforming feedback matrices corresponding to the plurality of OFDM tones, generate, based on the plurality of beamforming feedback matrices, a plurality of smoothed beamforming feedback matrices corresponding to the plurality of OFDM tones, including generating a particular smoothed beamforming feedback matrix corresponding to a particular OFDM tone using beamforming feedback matrices corresponding to OFDM tones within a window of N OFDM tones around the particular OFDM tones, wherein N is an integer greater than one, and generate the steering matrix information based on the plurality of smoothed beamforming feedback matrices.

In yet another embodiment, a method for beamforming training includes: transmitting, from a second communication device to a first communication device via a communication channel, a plurality of training signals; receiving, at the second communication device from the first communication device, feedback generated at the first communication device based on the plurality of training signals, wherein the feedback includes (i) steering matrix information for a plurality of orthogonal frequency division multiplexing (OFDM) tones and (ii) additional phase information corresponding to channel estimates obtained for the plurality of OFDM tones; constructing, at the second communication device based on the steering matrix information, a plurality of steering matrices corresponding to the plurality of OFDM tones; compensating, at the second communication device using the additional phase information, the plurality of steering matrices to reduce phase discontinuities between the OFDM tones; and steering, using the compensated steering matrices, at least one transmission via the communication channel from the second communication device to the first communication device.

In other embodiments, the method includes one of, or any suitable combination of two or more of, the following features.

The plurality of OFDM tones are spaced according to a first tone spacing corresponding to a first number of OFDM tones in an OFDM symbol, and steering the at least one transmission comprises using the compensated steering matrices to steer at least one OFDM symbol that corresponds to a second tone spacing corresponding to a second number of OFDM tone, wherein (i) the second tone spacing is smaller than the first tone spacing and (ii) the second number of OFDM tones is greater than the first number of OFDM tones.

The second number of OFDM tones is one of (i) twice the first number of OFDM tones or (ii) four times the number of OFDM tones.

Steering the at least one OFDM symbol includes generating, based on the compensated steering matrices, additional steering matrices for OFDM tones, of the at least one OFDM symbol, that are missing in the plurality of OFDM tones.

Generating, based on the compensated steering matrices, additional steering matrices for OFDM tones, of the at least one OFDM symbol, that do not correspond to OFDM tones in the plurality of OFDM tones comprises interpolating between compensated steering matrices corresponding to the plurality of OFDM tones.

Interpolating between compensated steering matrices corresponding to the plurality of OFDM includes compensating for phase roll between adjacent OFDM tones in the plurality of OFDM tones.

In still another embodiment, a network interface device has one or more integrated circuits. The one or more integrated circuits are configured to: transmit, to a communication device via a communication channel, a plurality of training signals; receive, from the communication device, feedback generated at the first communication device based on the plurality of training signals, wherein the feedback includes (i) steering matrix information for a plurality of orthogonal frequency division multiplexing (OFDM) tones and (ii) additional phase information corresponding to channel estimates obtained for the plurality of OFDM tones; construct, based on the steering matrix information, a plurality of steering matrices corresponding to the plurality of OFDM tones; compensate, using the additional phase information, the plurality of steering matrices to reduce phase discontinuities between the OFDM tones; and steer, using the compensated steering matrices, at least one transmission via the communication channel to the communication device.

In other embodiments, the apparatus includes one of, or any suitable combination of two or more of, the following features.

The plurality of OFDM tones are spaced according to a first tone spacing corresponding to a first number of OFDM tones in an OFDM symbol, and the one or more integrated circuits are configured to steer, using the compensated steering matrices, at least one OFDM symbol that corresponds to a second tone spacing corresponding to a second number of OFDM tone, wherein (i) the second tone spacing is smaller than the first tone spacing and (ii) the second number of OFDM tones is greater than the first number of OFDM tones.

The second number of OFDM tones is one of (i) twice the first number of OFDM tone or (ii) four times the number of OFDM tones.

The one or more integrated circuits are further configured to: generate, based on the compensated steering matrices, additional steering matrices for OFDM tones, of the at least one OFDM symbol, that are missing in the plurality of OFDM tones, and apply the additional steering matrices to corresponding OFDM tones of the at least one OFDM symbol.

The one or more integrated circuits are configured to generate the additional steering matrices for OFDM tones, of the at least one OFDM symbol, by interpolating between compensated steering matrices corresponding to the plurality of OFDM tones.

Interpolating between compensated steering matrices corresponding to the plurality of OFDM includes compensating for phase roll between adjacent OFDM tones in the plurality of OFDM tones.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communication in a wireless communication network, the method comprising:
receiving, at a first communication device, a sounding packet from a second communication device, the sounding packet including a first plurality of training orthogonal frequency division multiplexing (OFDM) symbols, the first plurality of training OFDM symbols corresponding to OFDM tones of respective training OFDM symbols, among the first plurality of training OFDM symbols, having been modulated with training signals, wherein each of the respective training OFDM symbols, among the first plurality of training OFDM symbols, has a first time duration, and wherein each training OFDM symbol among the first plurality of training OFDM symbols includes a first number of OFDM tones on which a training signal is modulated;
developing, at the first communication device, beamforming information using the first plurality of training OFDM symbols, the beamforming information for the first number of OFDM tones;
transmitting, by the first communication device, beamforming feedback to the second communication device, the beamforming feedback including the beamforming information for the first number of OFDM tones, the beamforming information for use by the second communication device to beamsteer a data packet to the first communication device, the data packet having a data portion that includes a second number of OFDM tones greater than the first number of OFDM tones, wherein the beamforming feedback i) includes beamforming information for a first subset of OFDM tones in the data portion of the data packet and ii) omits beamforming information for a second subset of OFDM tones in the data portion of the data packet; and
after transmitting the beamforming feedback, receiving, at the first communication device, the data packet from the second communication device, the data packet including one or more data OFDM symbols in the data portion, each of the one or more data OFDM symbols having i) a second time duration that is longer than the first time duration, and ii) the second number of OFDM tones, wherein OFDM tones of the one or more data OFDM symbols include i) the first subset of OFDM tones beamsteered based on the beamforming feedback that incudes beamforming information for the first subset of OFDM tones and ii) the second subset of OFDM tones beamsteered based on the beamforming feedback that omits beamforming information for the second subset of OFDM tones.

2. The method of claim 1, wherein the first time duration is shorter than the second time duration by a factor of at least 2.

3. The method of claim 1, wherein the first time duration is 6.4 μs.

4. The method of claim 3, wherein the second time duration is 12.8 μs.

5. The method of claim 1, wherein:
the data packet includes a second plurality of training OFDM symbols, the second plurality of training OFDM symbols corresponding to OFDM tones of respective training OFDM symbols, among the second plurality of training OFDM symbols, having been modulated with training signals, wherein the respective training OFDM symbols, among the second plurality of training OFDM symbols, have a third time duration, and wherein the first time duration of the respective training OFDM symbols among the first plurality of training OFDM symbols is longer than the third time duration of the respective training OFDM symbols among the second plurality of training OFDM symbols; and
the method further comprises:
determining, at the first communication device, channel information using the second plurality of training OFDM symbols, and
processing, at the first communication device, the one or more data OFDM symbols of the data packet using the channel information.

6. The method of claim 5, wherein:
the first time duration is 6.4 μs; and
the third time duration is 3.2 μs.

7. The method of claim 1, further comprising:
the data packet includes a second plurality of training OFDM symbols, the second plurality of training OFDM symbols corresponding to OFDM tones of respective training OFDM symbols, among the second plurality of training OFDM symbols, having been modulated with training signals, wherein the respective training OFDM symbols, among the second plurality of training OFDM symbols, have a third time duration, and wherein the first time duration of the respective training OFDM symbols among the first plurality of training OFDM symbols is shorter than the third time duration of the respective training OFDM symbols among the second plurality of training OFDM symbols; and
the method further comprises:
determining, at the first communication device, channel information using the second plurality of training OFDM symbols, and
processing, at the first communication device, the one or more data OFDM symbols of the data packet using the channel information.

8. The method of claim 7, wherein:
the first time duration is 6.4 μs; and
the third time duration is 12.8 μs.

9. The method of claim 1, wherein receiving the sounding packet comprises receiving a null data packet (NDP) that omits a data portion.

10. The method of claim 1, wherein:
the first plurality of training OFDM symbols of the sounding packet corresponds to a plurality of long training field (LTFs); and
the sounding packet further comprises one or more short training fields (STFs).

11. A first communication device, comprising:
a wireless network interface device implemented on one or more integrated circuits (ICs) that are configured to:
receive a sounding packet from a second communication device, the sounding packet including a first plurality of training orthogonal frequency division multiplexing (OFDM) symbols, the first plurality of training OFDM symbols corresponding to OFDM tones of respective training OFDM symbols, among the first plurality of training OFDM symbols, having been modulated with training signals, wherein each of the respective training OFDM symbols, among the first plurality of training OFDM symbols, has a first time duration, and wherein each training OFDM symbol among the first plurality of training OFDM symbols includes a first number of OFDM tones on which a training signal is modulated,
develop beamforming information using the first plurality of training OFDM symbols, the beamforming information for the first number of OFDM tones,
control the wireless network interface device to transmit beamforming feedback to the second communication device, the beamforming feedback including the beamforming information for the first number of OFDM tones, the beamforming information for use by the second communication device to beamsteer a data packet to the first communication device, the data packet having a data portion that includes a second number of OFDM tones greater than the first number of OFDM tones, wherein the beamforming feedback i) includes beamforming information for a first subset of OFDM tones in the data portion of the data packet and ii) omits beamforming information for a second subset of OFDM tones in the data portion of the data packet, and
after the wireless network interface device transmits the beamforming feedback, receive the data packet from the second communication device, the data packet including one or more data OFDM symbols in the data portion, each of the one or more data OFDM symbols having i) a second time duration that is longer than the first time duration, and ii) the second number of OFDM tones, wherein OFDM tones of the one or more data OFDM symbols include i) the first subset of OFDM tones beamsteered based on the beamforming feedback that incudes beamforming information for the first subset of OFDM tones and ii) the second subset of OFDM tones beamsteered based on the beamforming feedback that omits beamforming information for the second subset of OFDM tones.

12. The first communication device of claim 11, wherein the first time duration is shorter than the second time duration by a factor of at least 2.

13. The first communication device of claim 11, wherein the first time duration is 6.4 μs.

14. The first communication device of claim 13, wherein the second time duration is 12.8 μs.

15. The first communication device of claim 11, wherein:
the data packet includes a second plurality of training OFDM symbols, the second plurality of training OFDM symbols corresponding to OFDM tones of respective training OFDM symbols, among the second plurality of training OFDM symbols, having been modulated with training signals, wherein the respective training OFDM symbols, among the second plurality of training OFDM symbols, have a third time duration, and wherein the first time duration of the respective training OFDM symbols among the first plurality of training OFDM symbols is longer than the third time duration of the respective training OFDM symbols among the second plurality of training OFDM symbols; and the one or more ICs are further configured to:
 determine channel information using the second plurality of training OFDM symbols, and
 process the one or more data OFDM symbols of the data packet using the channel information.

16. The first communication device of claim 15, wherein:
the first time duration is 6.4 µs; and
the third time duration is 3.2 µs.

17. The first communication device of claim 11, further comprising:
 the data packet includes a second plurality of training OFDM symbols, the second plurality of training OFDM symbols corresponding to OFDM tones of respective training OFDM symbols, among the second plurality of training OFDM symbols, having been modulated with training signals, wherein the respective training OFDM symbols, among the second plurality of training OFDM symbols, have a third time duration, and wherein the first time duration of the respective training OFDM symbols among the first plurality of training OFDM symbols is shorter than the third time duration of the respective training OFDM symbols among the second plurality of training OFDM symbols; and
 the one or more ICs are further configured to:
  determine channel information using the second plurality of training OFDM symbols, and
  process the one or more data OFDM symbols of the data packet using the channel information.

18. The first communication device of claim 17, wherein:
the first time duration is 6.4 µs; and
the third time duration is 12.8 µs.

19. The first communication device of claim 11, wherein the sounding packet comprises a null data packet (NDP) that omits a data portion.

20. The first communication device of claim 11, wherein:
 the first plurality of training OFDM symbols of the sounding packet corresponds to a plurality of long training field (LTFs); and
 the sounding packet further comprises one or more short training fields (STFs).

21. The first communication device of claim 11, wherein the wireless network interface device comprises one or more transceivers implemented at least partially on the one or more ICs.

22. The first communication device of claim 21, further comprising:
 a host processor coupled to the wireless network interface device.

23. The first communication device of claim 22, further comprising:
 one or more antennas coupled to the one or more transceivers.

24. The first communication device of claim 21, further comprising:
 one or more antennas coupled to the one or more transceivers.

* * * * *